(12) United States Patent
Ko-Chien

(10) Patent No.: US 6,388,778 B1
(45) Date of Patent: May 14, 2002

(54) IMAGE SCANNER USING ONE SCANNING PASS TO PERFORM A PREVIEW SCAN AND A FORMAL SCAN

(75) Inventor: Chuang Ko-Chien, Chung-Ho (TW)

(73) Assignee: Primax Electronics Ltd., Taipei (TW)

( * ) Notice: Subject to any disclaimer, the term of this patent is extended or adjusted under 35 U.S.C. 154(b) by 0 days.

(21) Appl. No.: 09/293,969

(22) Filed: Apr. 19, 1999

(30) Foreign Application Priority Data

Dec. 31, 1998 (TW) .................................. 87121960 A

(51) Int. Cl.[7] .................................................. H04N 1/04
(52) U.S. Cl. ........................ 358/497; 358/486; 358/474
(58) Field of Search ................................ 358/497, 474, 358/471, 486, 488, 406, 504, 483, 482, 475, 461; 250/208.1, 234

(56) References Cited

U.S. PATENT DOCUMENTS 5,969,845 A * 10/1999 Tsai et al. .................... 358/474
6,028,681 A * 2/2000 Gray et al. ................... 358/475
6,278,808 B1 * 8/2001 Tsai et al. .................... 358/406

* cited by examiner

Primary Examiner—Cheukfan Lee
(74) Attorney, Agent, or Firm—Winston Hsu

(57) ABSTRACT

The present invention provides an image scanner comprising a housing having a transparent platform installed on it for placing a document, a calibrating area installed in the housing at a front end of the transparent platform, and a scanning module movably installed in the housing for scanning the document on the transparent platform. When performing a preview scan, the scanning module at a front end of the housing will move backward to scan the calibrating area to calibrate the scanning module and then scan the document on the transparent platform. When performing a formal scan, the scanning module that is stopped at a rear end of the housing will move forward to scan the document and stop at the front end of the housing.

12 Claims, 4 Drawing Sheets

IMAGE SCANNER USING ONE SCANNING PASS TO PERFORM A PREVIEW SCAN AND A FORMAL SCAN

BACKGROUND OF THE INVENTION

1. Field of the Invention

The invention relates to an image scanner, and more particularly, to an image scanner using one scanning pass to perform a preview scan and a formal scan.

2. Description of the Prior Art

Please refer to FIG. 1. FIG. 1 is a perspective view of a prior art image scanner 10. The image scanner 10 comprises a housing 12 having a transparent platform 14 for placing a document 16 to be scanned, a calibrating area 18 installed in the housing 12 at a front end of the transparent platform 14, and a scanning module 20 movably installed in the housing 12 for scanning the document 16 on the transparent platform 14, a driving device (not shown) for driving the scanning module 20, and a control circuit (not shown) for moving the scanning module 20 forward or backward. The calibrating area 18 comprises a white calibrating strip 24 and a black calibrating strip 26 for calibrating image signals generated by the scanning module 20.

When performing a preview scan, the control circuit first uses the driving device to drive the scanning module 20 to scan the calibrating area 18 at the front end of the housing 12. Then the scanning module 20 is moved backward to scan the document 16 positioned on the transparent platform 14. Finally, the scanning module 20 is moved forward to the front end of the housing 12. When the preview scan is performed, the control circuit stops moving the scanning module 20 and waits for a formal scan signal. When the control circuit receives a formal scanning signal, the control circuit again uses the driving device to drive the scanning module 20 to scan the calibrating area 18, and then drives the scanning module 20 backward to scan the document 16 on the transparent platform 14 to perform a formal scan. Finally, the scanning module 20 is moved forward to the front end of the housing 12.

Throughout this scanning process, time is wasted because the scanning module 20 has to make two scanning passes in the housing 12 to scan the document 16. Although a high speed scanning module can help alleviate this problem, it is very costly.

SUMMARY OF THE INVENTION

It is therefore a primary objective of the present invention to provide an image scanner using one scanning pass to perform a preview scan and a formal scan to solve the above mentioned problems.

Briefly, in a preferred embodiment, the present invention provides an image scanner comprising:

a housing having a transparent platform installed on it for placing a document;

a calibrating area installed in the housing at a front end of the transparent platform; and a scanning module movably installed in the housing for scanning the document on the transparent platform;

wherein when performing a preview scan, the scanning module at a front end of the housing will move backward to scan the calibrating area to calibrate the scanning module and then scan the document on the transparent platform, and when performing a formal scan, the scanning module stopped at a rear end of the housing will move forward to scan the document and stop at the front end of the housing.

It is an advantage of the present invention that the scanning module using one scanning pass to perform a preview scan and a formal scan so the time for scanning is much reduced. It also obviates the need for an expensive high-speed scanning module.

These and other objects and the advantages of the present invention will no doubt become obvious to those of ordinary skill in the art after having read the following detailed description of the preferred embodiment that is illustrated in the various figures and drawings.

DETAILED DESCRIPTION OF THE PREFERRED EMBODIMENT

Figure 1:
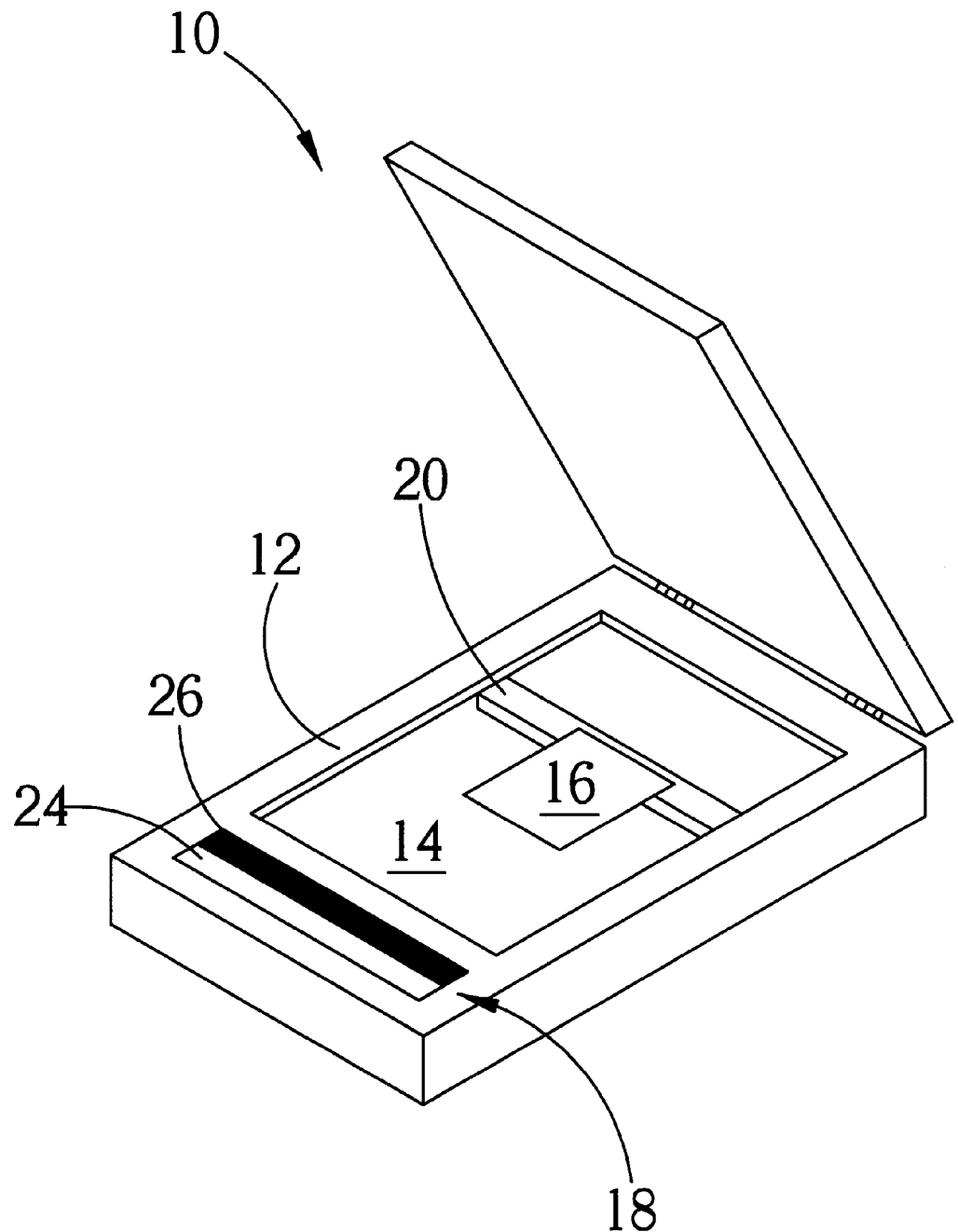
FIG. 1 is a perspective view of a prior art image scanner.
Figure 2:
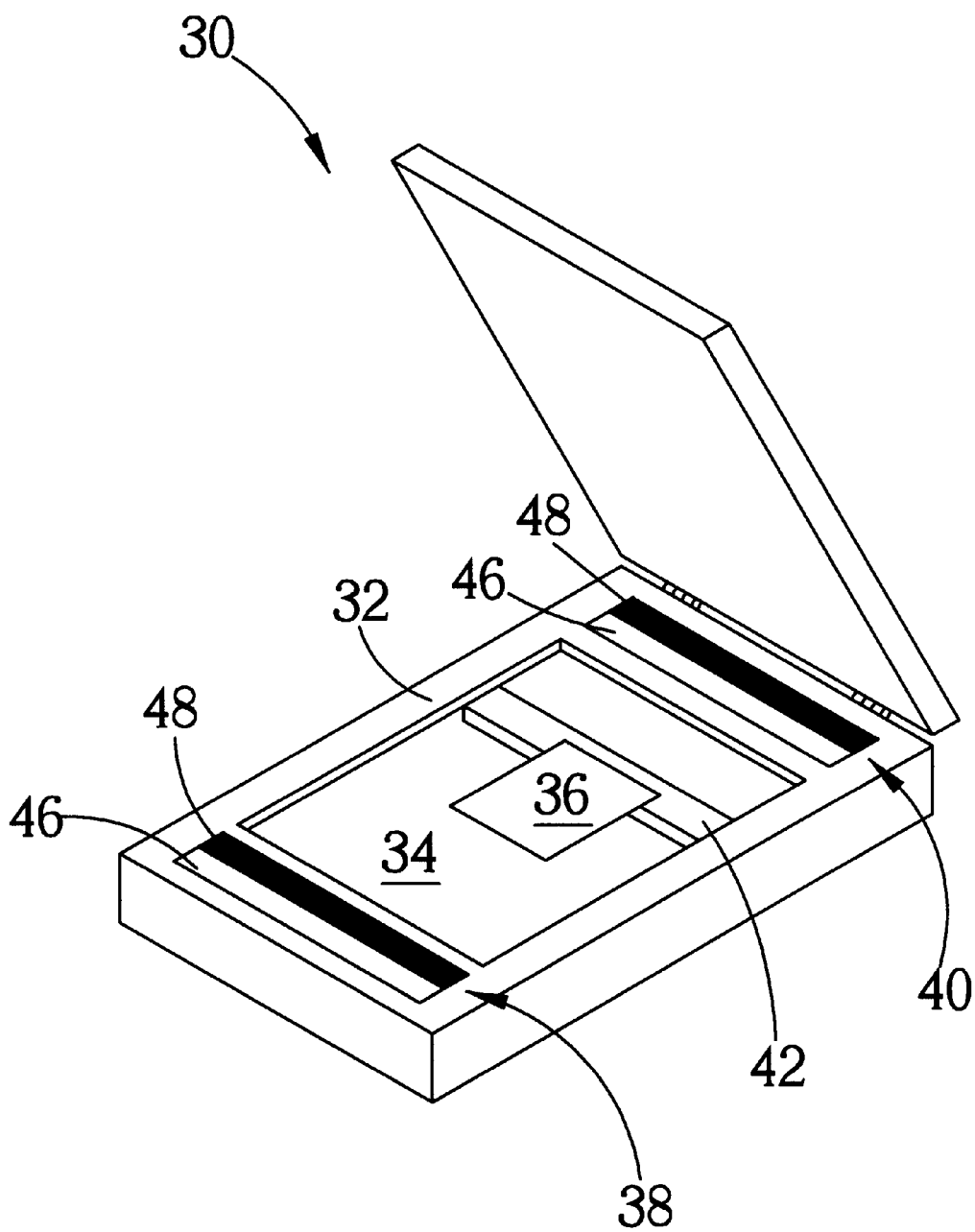
FIG. 2 is a perspective view of an image scanner according to the present invention.
Figure 3:
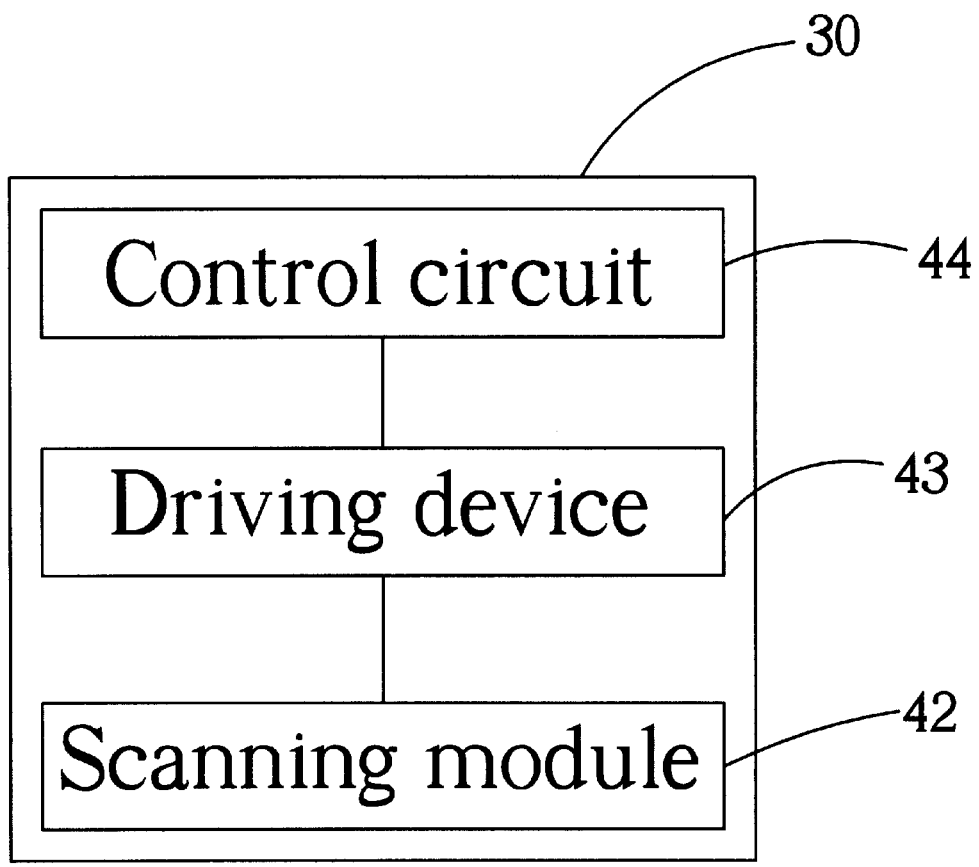
FIG. 3 is a functional block diagram of the image scanner in FIG. 2.

Please refer to FIG. 2 and FIG. 3. FIG. 2 is a perspective view of an image scanner 30 according to the present invention. FIG. 3 is a functional block diagram of the scanner 30 in FIG. 2. The scanner 30 comprises a housing 22 having a transparent platform 34 installed on it for placing a document 36, two calibrating area 38, 40 installed in the housing 32 at front and rear ends of the transparent platform 34, and a scanning module 42 movably installed in the housing 32 for scanning the document 36 on the transparent platform 34, a driving device 43 for driving the scanning module 42, and a control circuit 44 for controlling operations of the scanning module 42. The control circuit 44 uses the driving device 43 to drive the scanning module 20 forward or backward to scan the document 36. Each of the two calibrating areas 38, 40 comprises a white calibrating strip 46 and a black calibrating strip 48 for calibrating image signals generated by the scanning module 42.

When performing a preview scan, the control circuit 44 first uses the driving circuit to drive the scanning module 42 backward from the front end of the housing 32 to scan the calibrating area 38 at the front end of the housing 32. The scanning module 42 is then driven further backward to scan the document 36 and the calibrating area 40 at the rear end of the housing 32. When the preview scan is performed, the control circuit 44 brings the scanning module 42 to rest at the rear end of the housing 32 and waits for a formal scan signal. Once the formal scan signal is received by the control circuit 44, the control circuit 44 uses the driving device 43 to move the scanning module 42 forward from the rear end of the housing 32 to scan the document 36 on the transparent platform 34, and brings the scanning module 42 to rest at the front end of the housing 32.

Figure 4:
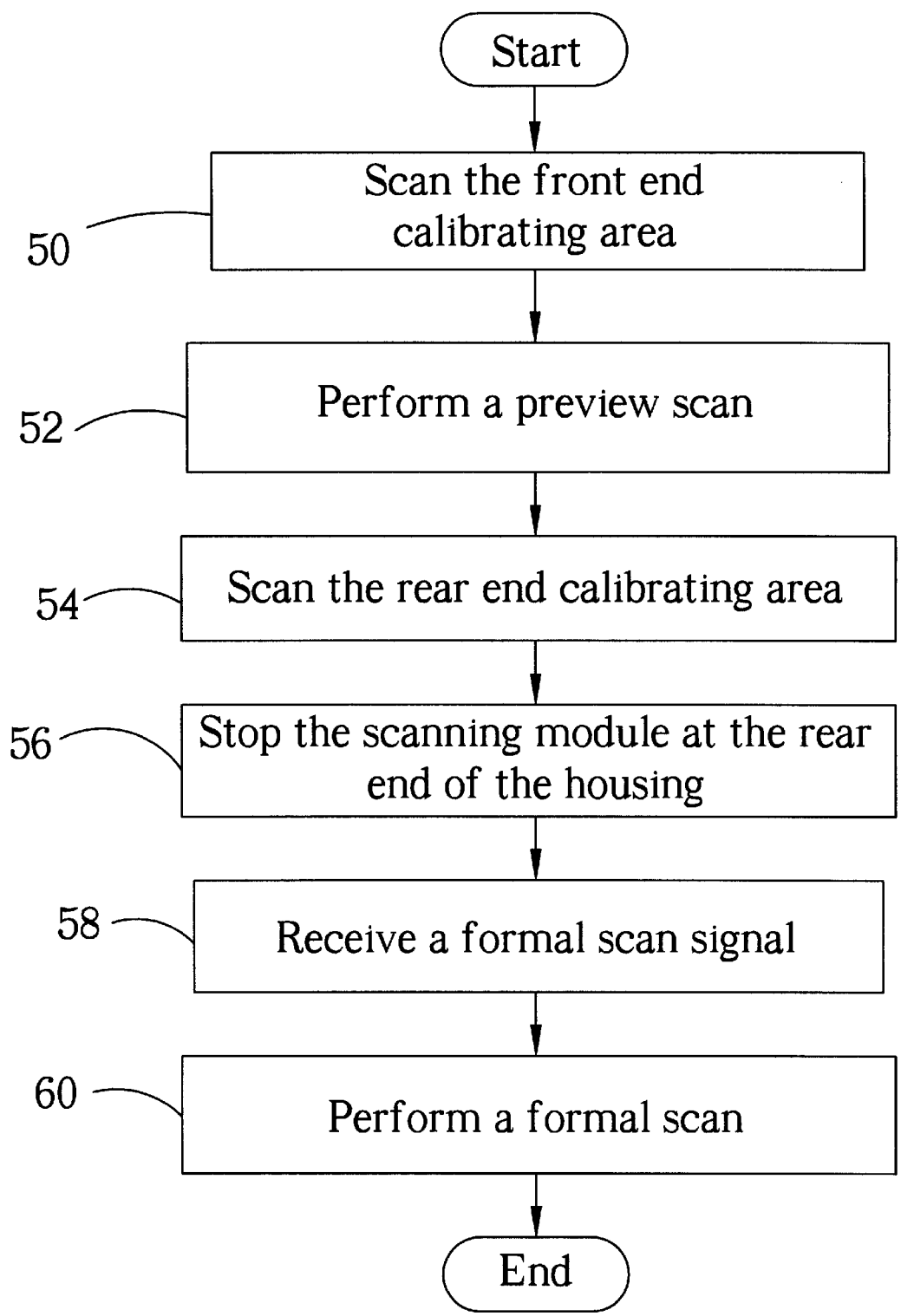
FIG. 4 is a flowchart of performing a scanning pass by the scanner in FIG. 2.

Please refer to FIG. 4. FIG. 4 is a flowchart of performing a scanning pass by the scanner 30. The scanner 30 is performed according to the following steps:

Step 50: moving the scanning module 42 backward from the front end of the housing 32 to scan the calibrating area 38 to calibrate the scanning module 42;

Step 52: moving the scanning module 42 backward to scan the document 36 on the transparent platform 34 for performing a preview scan;

Step 54: moving the scanning module 42 backward to scan the calibrating area 40 at the rear end of the housing 32 to calibrate the scanning module 42 once more;

Step 56: stopping the scanning module 42 at the rear end of the housing 32;

Step 58: receiving a formal scan signal;

Step 60: moving the scanning module 42 forward from the rear end of the housing 32 to scan the document 36 on the transparent platform 34 to perform a formal scan and then stopping the scanning module 42 at the front end of the housing 32.

The scanning module 42 of the scanner 30 can be brought to rest after performing a preview scan on the document 36, and then be driven to scan the calibrating area 40 at the rear end of the housing 32 and perform a formal scan when the control circuit receives a formal scan signal.

Moreover, the calibrating area 40 may be removed from the scanner 30. This, however, does not adversely affect the ability of the scanning module 42 to scan the document 36 in one scanning pass. The only difference is that calibration will not be performed at the rear end of the scanner 30.

In contrast to the prior art image scanner 10, the scanner 30 comprises calibrating areas 38, 40 at both the front and rear ends of the housing 32, respectively. Thus the scanning module 42 can scan the document 36 in one scanning pass to reduce the time for scanning. It also obviates the need for an expensive high-speed scanning module.

Those skilled in the art will readily observe that numerous modifications and alterations of the propeller may be made while retaining the teachings of the invention. Accordingly, the above disclosure should be construed as limited only by the metes and bounds of the appended claims.

What is claimed is:

1. An image scanner comprising:
   a housing having a transparent platform installed on it for placing a document;
   a calibrating area installed in the housing at a front end of the transparent platform; and
   a scanning module movably installed in the housing for scanning the document on the transparent platform;
   wherein when performing a preview scan, the scanning module at a front end of the housing will move backward to scan the calibrating area to calibrate the scanning module and then scan the document on the transparent platform, and when performing a formal scan, the scanning module stopped at a rear end of the housing will move forward to scan the document and stop at the front end of the housing.

2. The image scanner of claim 1 further comprising, wherein when performing the preview scan, the control circuit moves the scanning module backward to scan the calibrating area and the document on the transparent platform, and when performing the formal scan, the control circuit moves the scanning module forward to scan the document on the transparent platform and stops the scanning module at the front end of the housing.

3. The image scanner of claim 2 further comprising a driving device for driving the scanning module wherein the control circuit uses the driving device to drive the scanning module forward or backward.

4. The image scanner of claim 2 wherein when the scanning module completes the preview scan, the control circuit stops the scanning module at the rear end of the housing, and when the control circuit receives a formal scanning signal, the control circuit uses the driving device to drive the scanning module to perform the formal scan.

5. The image scanner of claim 1 wherein the calibrating area comprises a white calibrating strip and a black calibrating strip for calibrating image signals generated by the scanning module.

6. The image scanner of claim 1 further comprising a calibrating area installed in the housing at a rear end of the transparent platform wherein when performing the preview scan, the scanning module moves backward to scan the calibrating area at the front end of the housing to calibrate the scanning module and then scans the document on the transparent platform, and when performing the formal scan, the scanning module moves forward to scan the calibrating area at the rear end of the housing to calibrate the scanning module and then scans the document on the transparent platform.

7. A scanning method of an image scanner which comprises:
   a housing having a transparent platform installed on it for placing a document;
   a calibrating area installed in the housing at a front end of the transparent platform; and
   a scanning module movably installed in the housing for scanning the document on the transparent platform;
   the scanning method comprising:
   moving the scanning module backward from a front end of the housing to scan the calibrating area to calibrate the scanning module and then scan the document on the transparent platform to perform a preview scan; and
   moving the scanning module forward to scan the document on the transparent platform to perform a formal scan and then stopping the scanning module at the front end of the housing.

8. The scanning method of claim 7 wherein the scanner further comprises a control circuit for controlling operations of the scanner wherein when performing the preview scan, the control circuit moves the scanning module backward to scan the calibrating area and the document on the transparent platform, and when performing the formal scan, the control circuit moves the scanning module forward to scan the document on the transparent platform and stops the scanning module at the front end of the housing.

9. The scanning method of claim 8 wherein the scanner further comprises a driving device for driving the scanning module wherein the control circuit uses the driving device to drive the scanning module forward and backward.

10. The scanning method of claim 8 wherein when the scanning module completes the preview scan, the control circuit stops the scanning module at the rear end of the housing, and when the control circuit receives a formal scanning signal, the control circuit uses the driving device to move the scanning module forward to perform the formal scan.

11. The scanning method of claim 7 wherein the calibrating area comprises a white calibrating strip and a black calibrating strip for calibrating image signals generated by the scanning module.

12. The scanning method of claim 7 wherein the image scanner further comprises a calibrating area installed at a rear end of the transparent platform and wherein when performing the formal scan, the scanning module is moved forward to scan the calibrating area at the rear end of the transparent platform to calibrate the scanning module and then scan the document placed on the transparent platform.

* * * * *